United States Patent [19]

Mazumder

[11] Patent Number: 4,484,068
[45] Date of Patent: Nov. 20, 1984

[54] BAR CODE PROCESSING APPARATUS

[75] Inventor: Ali T. Mazumder, Waterloo, Canada

[73] Assignee: NCR Canada Ltd - NCR Canada LTEE, Mississauga, Canada

[21] Appl. No.: 439,148

[22] Filed: Nov. 4, 1982

[51] Int. Cl.³ .............................................. G06K 7/10
[52] U.S. Cl. .................................... 235/462; 235/463
[58] Field of Search .................. 235/462, 463; 382/68

[56] References Cited

U.S. PATENT DOCUMENTS 4,402,088 8/1983 McWaters ...................... 235/462 X Primary Examiner—Harold L. Pitts
Attorney, Agent, or Firm—J. T. Cavender; Wilbert Hawk, Jr.; Richard W. Lavin

[57] ABSTRACT

There is disclosed a bar code processing system in which a plurality of vertically aligned sensing devices are positioned adjacent a moving document on which is located a plurality of dot matrix printed coded bars. Each of the sensing devices is positioned so as to sense one of the matrix dots which form the coded bar and output an analog signal whose signal level varies directly in accordance with the ink intensity of the sensed dot. Signals are then amplified, filtered and converted to digital signals which are then examined. If a predetermined number of dots in the bar have been sensed and of the dots sense, no more than two dots are found to be separated by more than one blank space where a dot would normally be located, a signal is generated indicating that a valid bar has been sensed. These signals are then used in decoding the bars sensed.

9 Claims, 9 Drawing Figures

BAR CODE PROCESSING APPARATUS

BACKGROUND OF THE INVENTION

The present invention relates, in general, to optical scanning systems and more particularly to an optical system for reading bar codes on documents such as checks.

The use of optical bar codes printed on financial documents is well-established in the banking industry and in processing of which documents, optical readers are employed. Ideally, the presence of a bar would be indicated by one of two states, and the absence of a bar would be indicated by the other of two states. In processing these documents, speed in reading is a critical requirement. Due to limitations in printing the bars on documents, during which ink splatter and smudging of the bar occurs, prior bar code readers have been unable to process the document at the desired speed. Other problems encountered in reading these documents include endorsement indicia stamped by the bank over the bar code, the color and quality of the paper and the presence of a design printed on the document on which the bar code is printed. Further problems include the printing of bars which are not vertical and the skewed condition of the document when in a reading position. In order to reduce the cost of printing coded bars on a document, matrix printers have been employed for printing bars comprising a row of dots and using fluorescent ink to increase the light density reflected from the dots. Using a single-slot type read head in reading bars printed by this type of printing process still has not overcome the above-cited problems. It is therefore a principal object of this invention to provide a bar code reader which overcomes the above-cited problems in bar code printing. It is a further object of this invention to provide a bar code reader for accurately detecting the presence of a bar on a document traveling at a relatively high rate of speed. It is another object of this invention to provide a bar code reader whose construction is relatively simple and therefore low in cost.

SUMMARY OF THE INVENTION

These and other objects of the invention are fulfilled by providing a bar code reader for reading a dot matrix printed coded bar on a document comprising a plurality of vertically orientated dots printed with a fluorescent ink, which bar code reader includes a plurality of aligned photo-detector sensing members each of which is positioned to sense one of the dots of the bar. Voltage signals generated by the sensing members are amplified, filtered and digitized to provide a binary output voltage having a logical state indicating the presence or absence of a dot. The output voltage signals are then qualified to determine if the dots sensed constitute a bar or not. This qualification includes identifying a predetermined number of dots sensed in the row and the location of the dots sensed with respect to each other. If the signals generated meet the qualifications, a signal is generated indicating the presence of a bar. These bar indicating signals are then processed for use in identifying the data represented by the printed bars.

The foregoing and various other objects, advantages and meritorious features of the present invention will be apparent from the following detailed description and appended claims when read in conjunction with the drawings, wherein like numerals identify corresponding elements.

BRIEF DESCRIPTION OF THE DRAWINGS

FIG. 8 is a diagram showing the manner in which FIGS. 7A and 7B are arranged to form the logic stages.

DESCRIPTION OF THE PREFERRED EMBODIMENT

Figure 1:
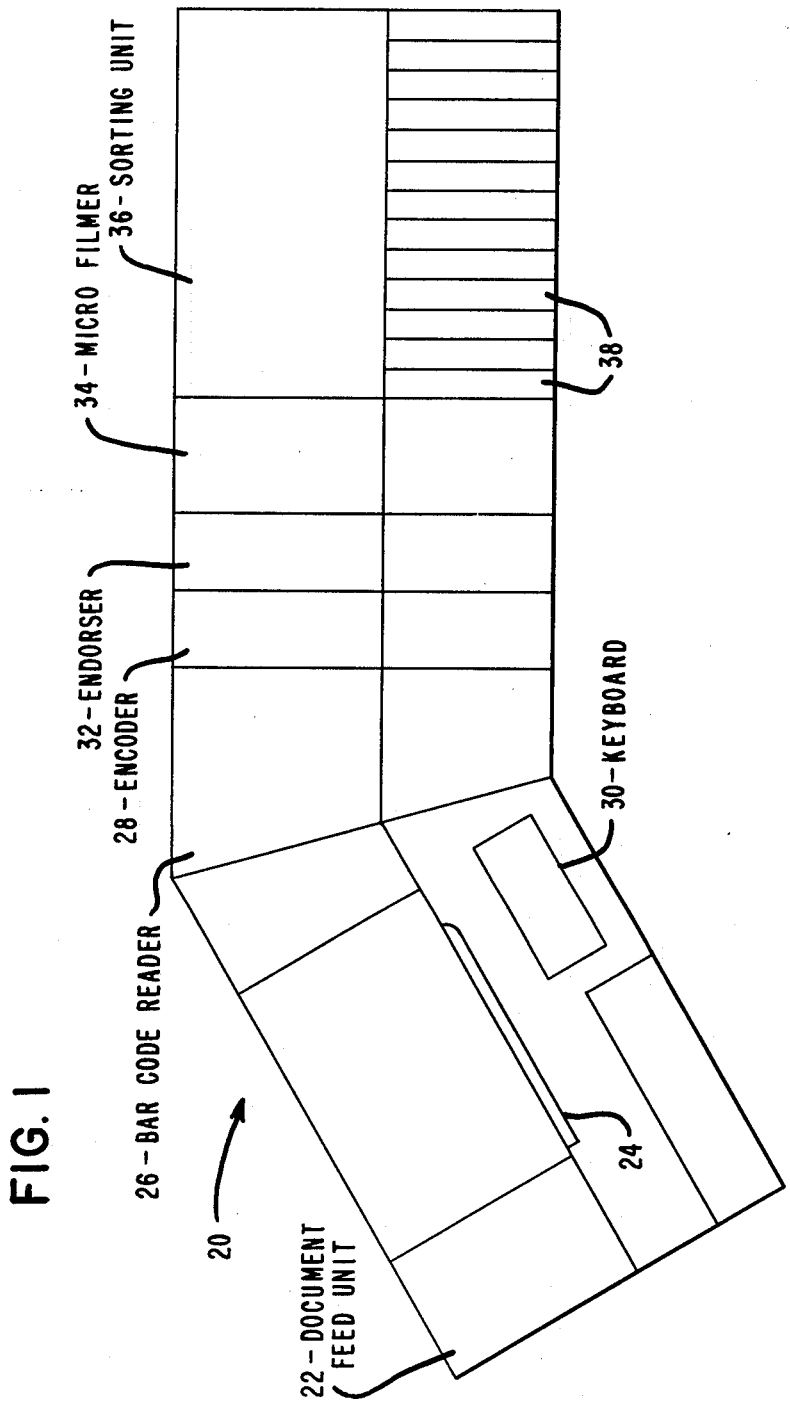
FIG. 1 is a plan view of a check processing apparatus which includes the bar code reader of the present invention.

Referring to FIG. 1, there is shown a plan view of a check processing apparatus 20 used in processing bank checks or other financial documents as part of a deposit proof or similar operation. Included in the apparatus 20 is a document feed unit 22 in which documents to be processed are fed seriatim into a document transport mechanism (not shown) located within the apparatus 20 for transporting the document through the apparatus, a CRT display unit 24 for displaying the face of the document being transported, a bar code reader 26 which is the subject of the present invention for reading a bar code printed on the document, an encoder mechanism 28 for printing data on the document and control characters used in processing the document (inserted from a keyboard 30), an endorser mechanism 32 for endorsing the document processed, a microfilm mechanism 34 for microfilming the document and a sorting module 36 comprising a plurality of storage pockets 38 in which documents are stored according to their destination. Also included within the apparatus 20 is an image lift unit for scanning the face of the document and generating signals used for displaying the face of the document on the CRT 24. The present invention is directed to the bar code reader for reading the bar code printed on the document in order to increase the speed of the document through the apparatus 20 while providing a high sensing accuracy of the bar code.

Figure 3:
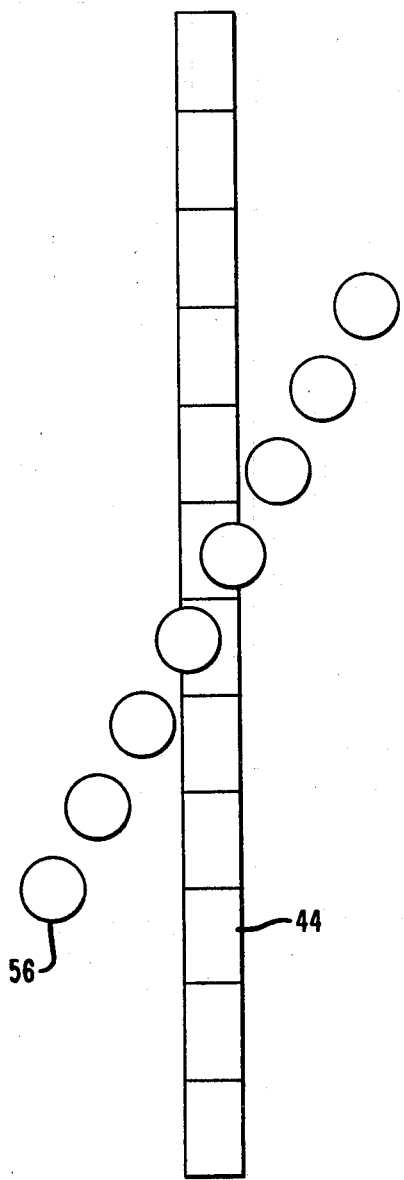
FIG. 3 is a schematic representation of a bar skewed with respect to the photo-detector sensing elements.
Figure 4:
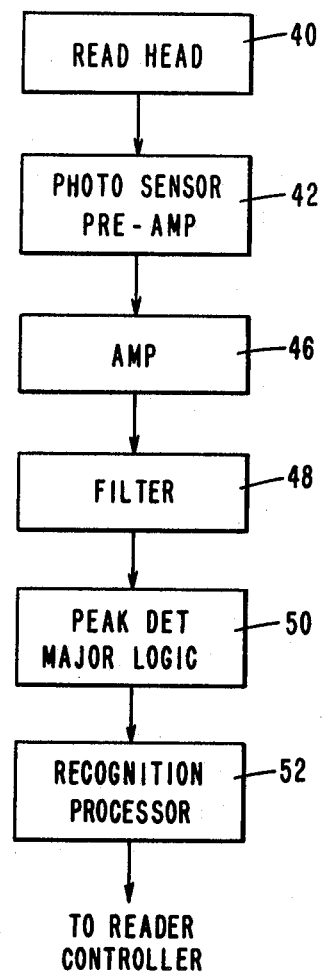
FIG. 4 is a block diagram of the bar code reader of the present invention.

Referring now to FIG. 4, there is shown a block diagram of the bar code reader 26 comprising a read head block 40 which includes a light sensor mechanism for generating light beams and optical elements arranged in a conventional manner to focus the light beams at the surface of the document and for gathering the reflected light beams from the document, a photo-sensor and pre-amp block 42 which includes a plurality of photo-detectors (FIGS. 2 and 3) each of which detects the reflected light and generates a current whose level is proportional to the amount of light detected and a pre-amplifier stage for amplifying the output of the photo-detectors, an amplification block 46 which includes a stage of amplifiers for amplifying the output signals of the pre-amplifier block 42, a filter block 48 for filtering out unwanted noise in the signals received from the amplification block 46, a peak detector and majority selecting logic block for digitizing the analog signal output of the filter block 48 and a majority selection logic unit for qualifying the digital signals as a bar or not, and a recognition processor block 52 for decoding the bars detected by the read head block 40.

Figure 2:
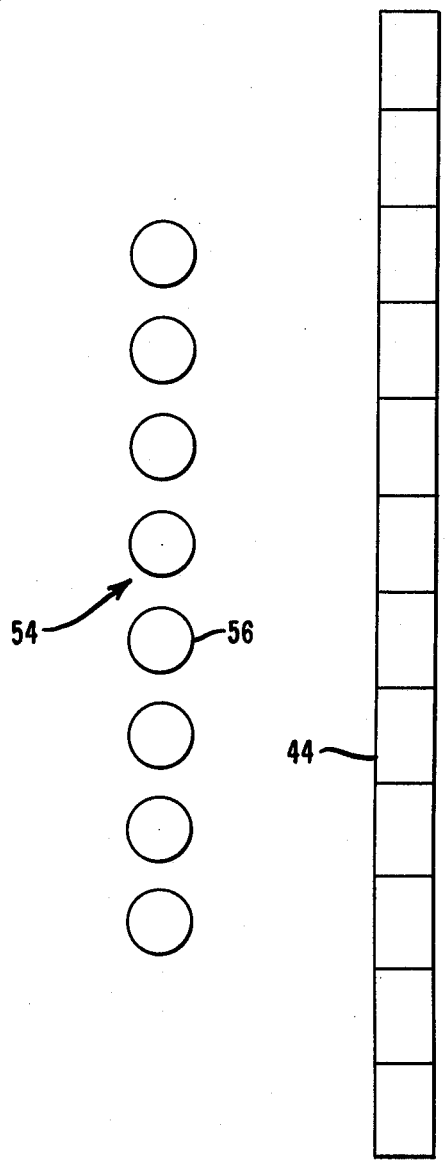
FIG. 2 is a schematic representation of a bar showing the location of the dots with respect to the photo-detector sensing elements.
Figure 5:
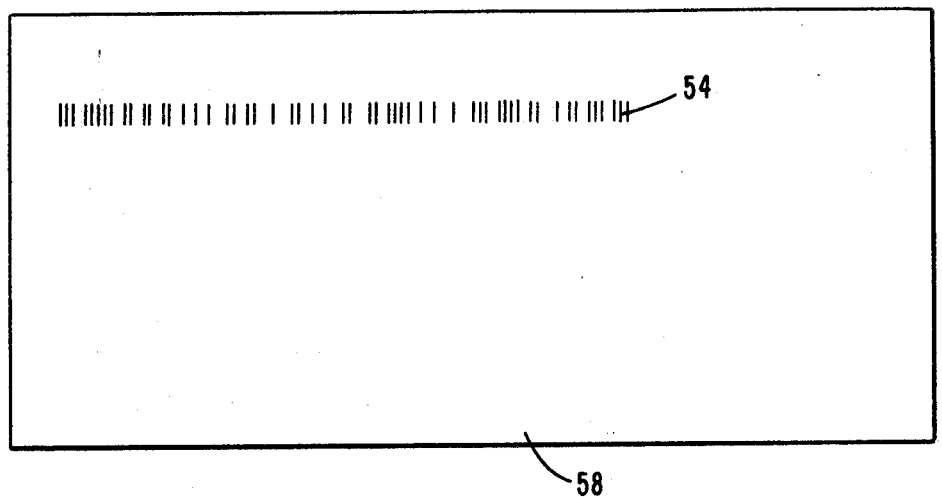
FIG. 5 is a plan view of a document showing an example of the printed bar code.

Referring now to FIG. 2, there is shown a schematic representation of a bar printed on a document transported through the apparatus 20 (FIG. 1) and sensed by the bar code reader 26 thereof. The bar indicated generally by the numeral 54 comprises a series of eight dots 56 vertically aligned to form the bar and which are printed in fluorescent ink. Aligned with the bar 54 in a sensing position are twelve photo-detectors 44 which comprise the read head block 40 (FIG. 4), and of which twelve photo-detectors eight will be positioned to sense the eight dots 56 comprising the bar 54. The upper two photo-detectors 44 and the lower two photo-detectors provide detection of the bar 54 during an overscan or underscan read condition which occurs due to the misalignment of the photo-detectors 44 with the bar 54. As shown in FIG. 5, the bars 54 printed on the document, such as check 58, comprise a code in which the presence or absence of a bar within a prescribed number of bar positions represents a character in a manner that is well-known in the art. The alignment of the bars 54 with the photo-detectors 44 when a document is in a skewed position is shown in FIG. 3. This arrangement will be discussed more fully hereinafter.

Figure 6:
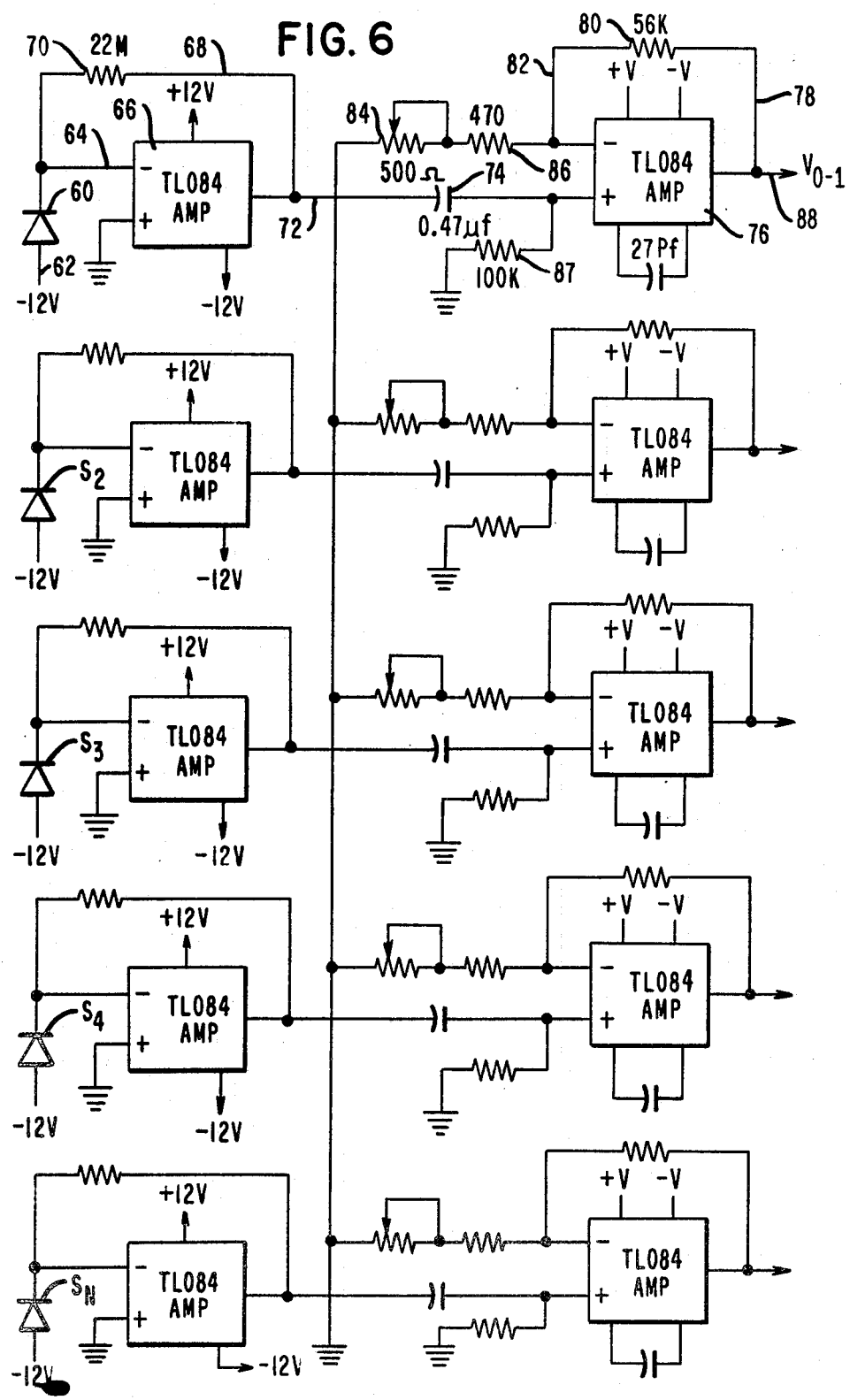
FIG. 6 discloses the pre-amp and the amplified stages of the bar code reader.

Referring now to FIG. 6, there is shown a circuit arrangement of the photosensor block 42 and the amplification block 46 (FIG. 4). Since the circuit associated with each of the photo-detectors 44 (FIG. 2) is the same, the circuit associated with one of such photo-detectors 44 will be described with the understanding that the construction and operation of the circuit for each of the remaining photo-detectors is the same. As shown in FIG. 6, each photo-detector 44 (FIGS. 2 and 3) comprises an HP 4203 reverse bias photo-diode 60 which is commercially available from the Intel Corporation of Santa Clara, Calif., and which is supplied with a −12 volt power supply over line 62. The diode 60 will output a voltage signal between 0 and 12 volts depending on the density of the light beams reflected from the document 58. Since the dots 56 are printed in fluorescent ink, the sensing of the dots will produce a higher voltage output of the sensor 60 than the level of the signal when sensing the absence of a dot. The output signal of the sensor 60 is transmitted over line 64 to the negative input of a TL084 operational amplifier 66 comprising the pre-amplifier stage of the block 42 (FIG. 4). The amplified output analog signal of the amplifier is fed back over line 68 through a 22M resistor 70 to produce the gain for the amplifier. The output of the amplifier is coupled over line 72 and through a 0.47 uf coupling capacitor 74 to the positive input of a second TL084 operational amplifier 76 whose output signal is fed back over line 78 and through the 56K feedback resistor 80 and over line 82 to the negative input of the amplifier 76 for controlling the gain of the amplifier. The gain of the amplifier 76 is further controlled by a 500 ohm variable resistor 84 and a 470 ohm resistor 86. The input line 72 is grounded through a 100K resistor 87.

Figure 7A:
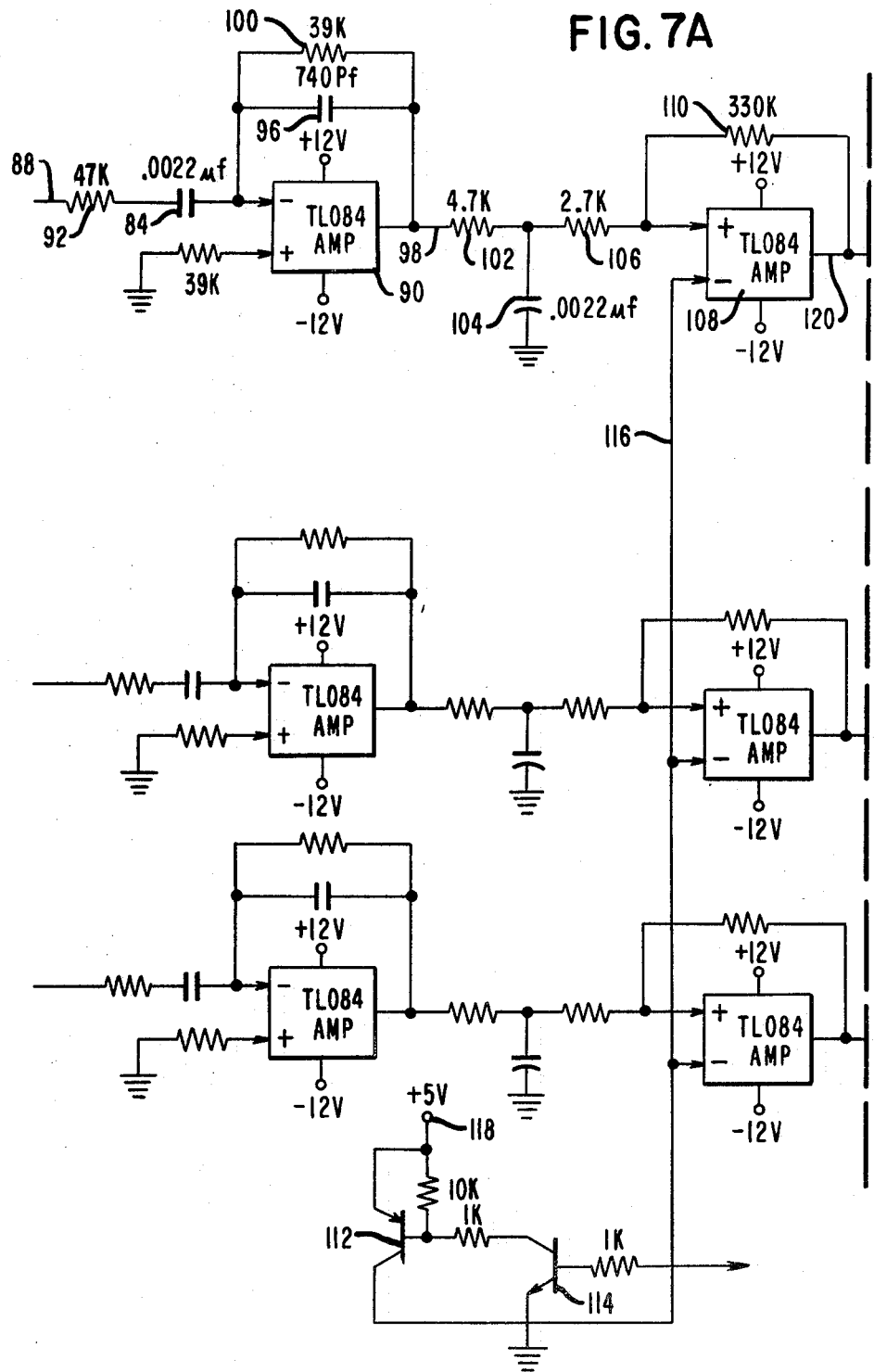
FIGS. 7A and 7B taken together disclose the filtering, digitizing and majority selecting logic stages of the bar code reader.

The amplified analog voltage output signal of the amplifier 76 is outputted over line 88 to the negative input of a further TL084 operational amplifier 90 (FIG. 7A) which applies a threshold value to the analog signal for filtering out any noise signals therein. The amplifier 90, as well as all other TL084 operational amplifiers employed in the present invention, are commercially available from Texas Instruments Corporation of Dallas, Tex. The inputted signal appearing on line 88 is transmitted through a 47K voltage resistor 92 and is inverted by a 0.0022 uf capacitor 84. A 740 pf capacitor 96 is connected in a feedback configuration from the output line 98 of the amplifier 90 to the input line 88 to provide the filtering action of the amplifier. A 39K feedback resistor 100 is connected in a similar manner. The filtered output signal of the operational amplifier 90 is transmitted through a compensating network comprising a 4.7K resistor 102 and 0.0022 uf capacitor 104. The resulting signal is then transmitted through a 2.7K dropping resistor 106 to the positive input of still a further TL084 operational amplifier 108 which includes a 330K feedback resistor 110. Such amplifier 108 will output a square wave signal in accordance with the upper voltage limit set by the level of the voltage signal appearing at the positive input of the amplifier 108. The amplifier 108 also receives a negative bias over line 116 derived from a pair of transistors 112 and 114 (FIG. 7A) wired in series and connected to a +5 volt power source 118. This negative bias which appears on line 116 provides a lower limit to the square wave response of the amplifier 108.

Figure 7B:
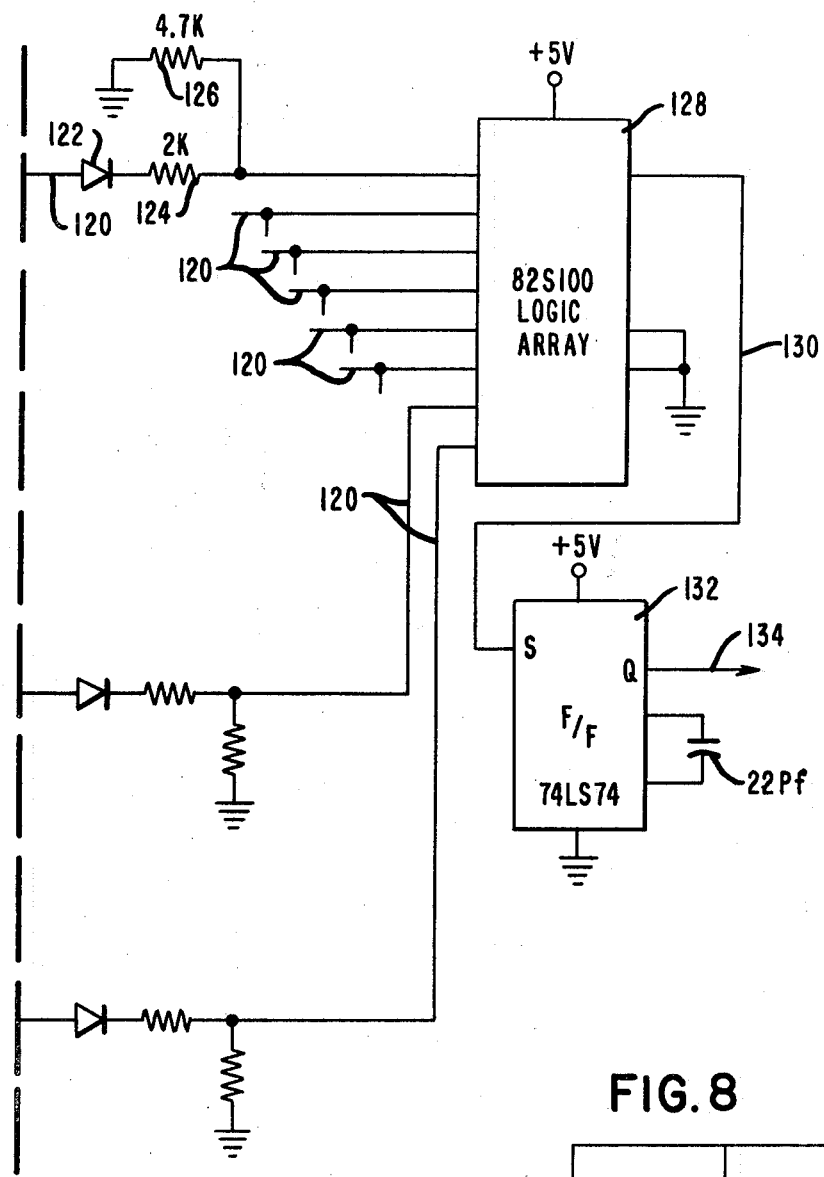
Figure 8:
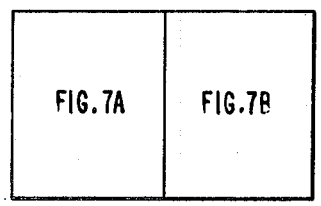

The digital output signal of the amplifier 108 is then transmitted over line 120 through a diode 122 (FIG. 7B) which removes any remaining negative pulses contained in the signal and through a signal matching network comprised of the 2K resistor 124 and a further 4.7K resistor 126. The resulting signal is then transmitted to one input of an Intel 82S100 logic array 128 which is also commercially available from the Intel Corporation of Santa Clara, Calif. As understood from FIG. 7B, each of the eight digital signals representing the output of the photodetectors 44 (FIGS. 2 and 3) is transmitted over line 120 to the logic array 128. The logic array 128, comprising essentially a plurality of AND gates, will output a high signal over line 130 when the following two conditions are true: at least five of the eight inputted digital signals 120 received has a high signal level indicating the sensing of a black dot 56 (FIGS. 2 and 3) and that of the black dots sensed, no more than two of the dots are separated by a blank space. It will be seen from FIGS. 2 and 3 that if these two conditions are met, the sensing of a bar which comprises dots of ink which are not continuous and comprises ink splatters present as a result of the printing operation will be eliminated. In the case where the bar is printed in a skewed position (FIG. 3) or where the document is skewed when in a reading position, the meeting of the two conditions will differentiate between a skewed condition which is readable and a skewed condition which is not. Then it will be seen that the bar reader will be able to sense a higher number of valid bars thereby allowing the documents to be transported past the read head at a higher speed.

The high output signal of the array 128 is transmitted over the line 130 to a set input of a 74LS74 flip-flop 132 which will output a high signal over the Q output line 134 to the recognition processor block 52 (FIG. 4) for use in decoding the sensed coded bars and to output the resulting data signal to a reader controller associated with the bar code reader 26.

Numerous modifications and adaptions of the system of the present invention will be apparent to those skilled in the art and thus, it is intended by the appended claims to cover all such modifications and adaptions which fall within the true spirit and scope of this invention.

I claim:

1. A method for processing a bar code having a plurality of bars each consisting of a first predetermined number of elemental areas arranged in a predetermined direction on a document comprising the steps of:

passing the bars past a plurality of detectors with each detector being positioned to sense the presence of one of said elemental areas;

generating detecting signals representing the presence or absence of said elemental area;

applying a threshold value to the detecting signals to substantially reduce any noise signals from the detecting signals;

converting the thresholded detecting signals to corresponding digital signals; and examining the number of digital signals to output a control signal indicating the detection of a valid bar when a second predetermined number of elemental areas is detected which is less than the first predetermined number with no more than two of the elemental areas detected being separated by a location not occupied by an elemental area.

2. A method for processing a bar code having a plurality of bars each consisting of a first predetermined number of vertically orientated dots printed on a document comprising the steps of:

moving the bars past a plurality of vertically orientated scanning members each aligned to scan the presence or absence of a dot;

producing a plurality of analog signals each corresponding to the presence or absence of a dot;

amplifying each of the analog signals;

filtering each of the amplified analog signals to eliminate noise signals and to produce a filtered analog signal;

digitizing the filtered analog signal to produce binary signals having first and second binary levels representing the presence and absence of a dot;

examining the location and the signal level of the binary signals; and producing a control signal indicating the presence of a bar upon detecting the presence of a second predetermined number of dots which is less than the first predetermined number of dots and no more than two of the dots scanned are separated a space not occupied by a dot.

3. A process for the optical recognition of a bar code in which the bars are composed of a first predetermined number of dots printed consecutively in a vertical direction comprising the steps of:

scanning each dot of a bar by moving the bar past a plurality of photoelectric sensing elements which are arranged in a column, the movement of the bars being perpendicular to the column of sensing elements;

generating a first analog signal for each dot sensed;

generating a second analog signal for each dot not sensed;

amplifying and filtering out any noise signals in said first and second analog signals;

reshaping the analog signals to produce a digital signal; and evaluating the digital signals to produce a control signal representing the scanning of a bar when a second predetermined number of dots is scanned which is less than said first predetermined number of dots and, of the dots scanned, no more than two of the dots are separated by a location not having a dot.

4. In combination with a document having printed thereon a bar code consisting of a plurality of bars composed of a first predetermined number of dots, a system for recognizing the scanning of a bar comprising:

means for scanning each of said dots for producing a first analog signal representing the presence of a dot and a second analog signal representing the absence of a dot;

means connected to said scanning means for amplifying said first and second analog signals;

means connected to said amplifying means for removing noise signals from said first and second analog signals;

means connected to said removing means for converting said first and second analog signals into corresponding first and second digital signals; and logic means connected to said converting means for examining said first and second digital signals, said logic means outputting a control signal indicating the scanning of a valid bar upon receiving a second predetermined number of said first digital signals and no more than two of the first digital signals received being separated by a second digital signal.

5. The system of claim 4 in which said scanning means comprises a plurality of photodiode members arranged in a linear array extending in a direction parallel to the bars wherein each of the photodiode members is aligned to scan a dot location of the bar, each of said photodiode members outputting a first analog signal representing the presence of a dot and a second analog signal representing the absence of a dot.

6. The system of claim 5 in which said amplifying means comprises a plurality of first amplifying members each connected to one of said photodiode members for raising the signal level of said first and second analog signals to a first signal level and a plurality of second amplifying means each connected to one of said first amplifying means for amplifying the signal level of said first and second analog signals to a second signal level.

7. The system of claim 6 in which said first predetermined number of dots is eight and said second predetermined number of dots is five.

8. The system of claim 7 in which said removing means and said converting means comprise operational amplifier logic circuits.

9. In combination with a document having printed thereon a bar code consisting of a plurality of vertically orientated bars composed of a first predetermined number of printed dots, a system for recognizing the presence of a valid bar comprising:

a plurality of photodiode members arranged in a linear array extending in a direction parallel to the bars of the bar code, each of the photodiode members being aligned to scan a single dot location and for outputting a first analog signal representing the presence of a dot and a second analog signal representing the absence of a dot;

a plurality of first amplifying members for amplifying said first and second analog signals;

a plurality of first analog comparators connected to said amplifying members for comparing the signal level of each of said first and second analog signals with a reference signal level to remove any noise signals from the analog signals;

a plurality of operational amplifiers connected to said comparators for converting said first and second analog signals into corresponding first and second digital signals; and logic means connected to said operational amplifiers for examining said first and second digital signals, said logic means outputting a control signal indicating the scanning of a valid bar upon receiving a second predetermined number of said first digital signals of which no more than two are separated by a second digital signal.

* * * * *